Figure 1:
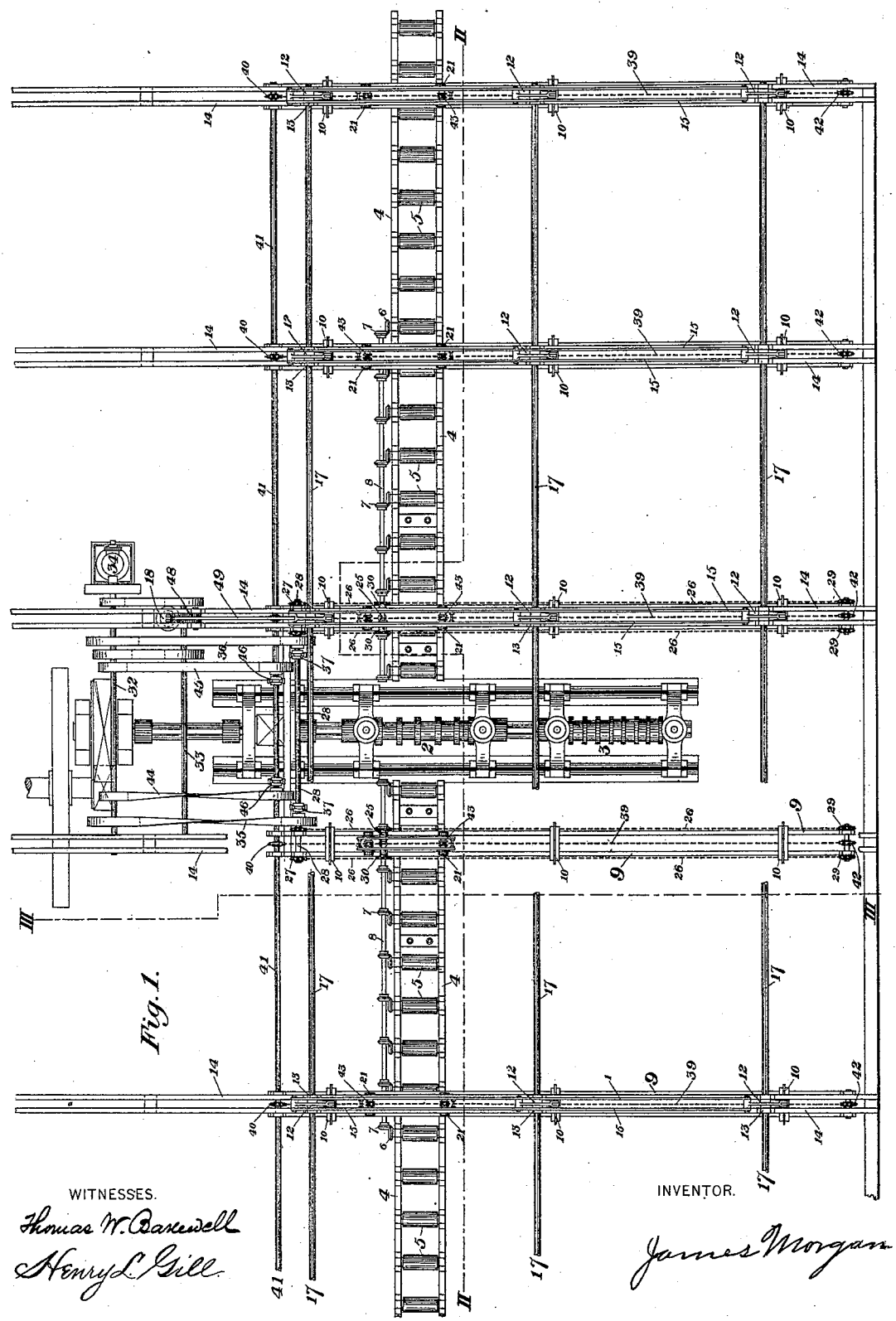

(No Model.)  3 Sheets—Sheet 1.

J. MORGAN.
FEED TABLE FOR ROLLING MILLS.

No. 403,204. Patented May 14, 1889.

WITNESSES.  INVENTOR.

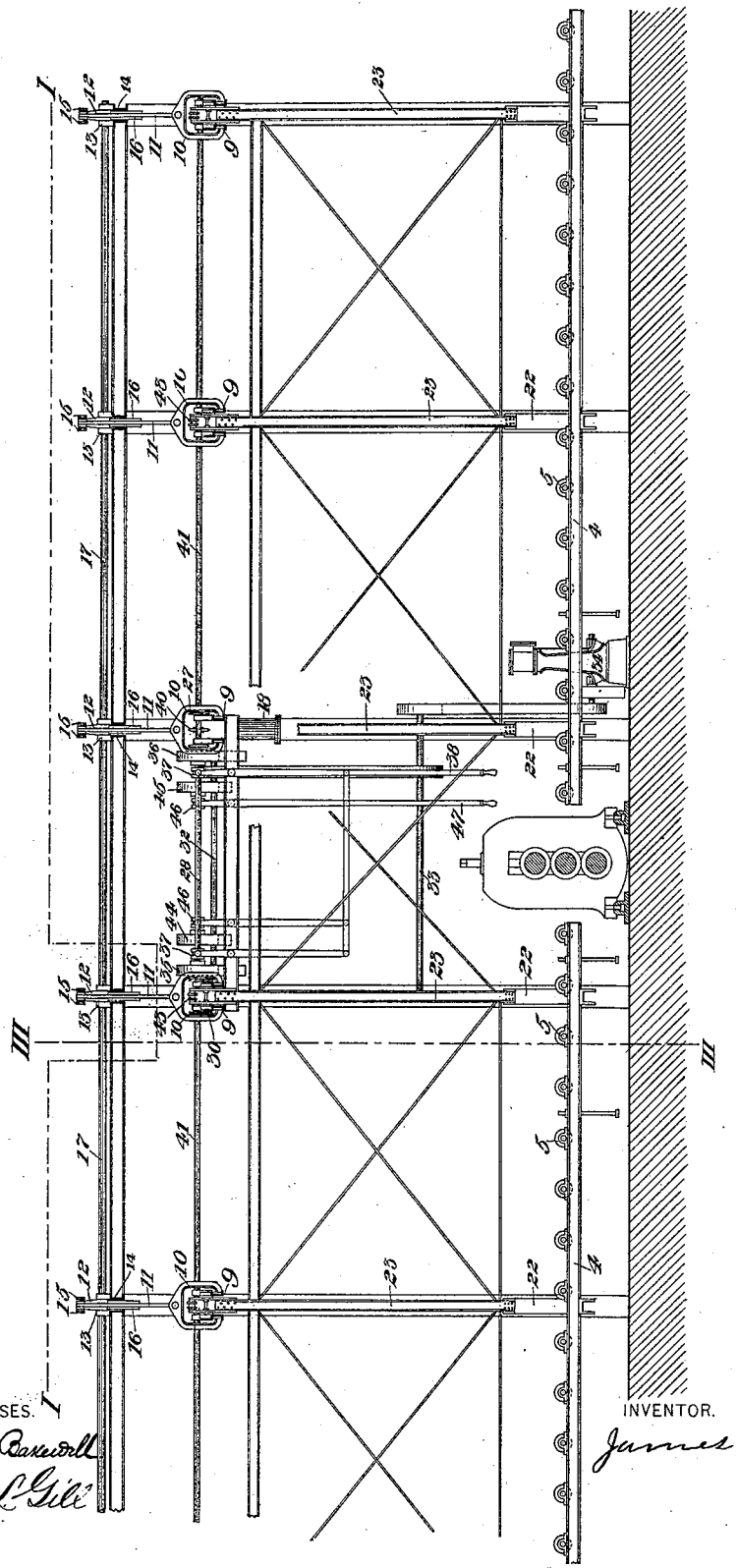

(No Model.) 3 Sheets—Sheet 3.
J. MORGAN.
FEED TABLE FOR ROLLING MILLS.
No. 403,204. Patented May 14, 1889.
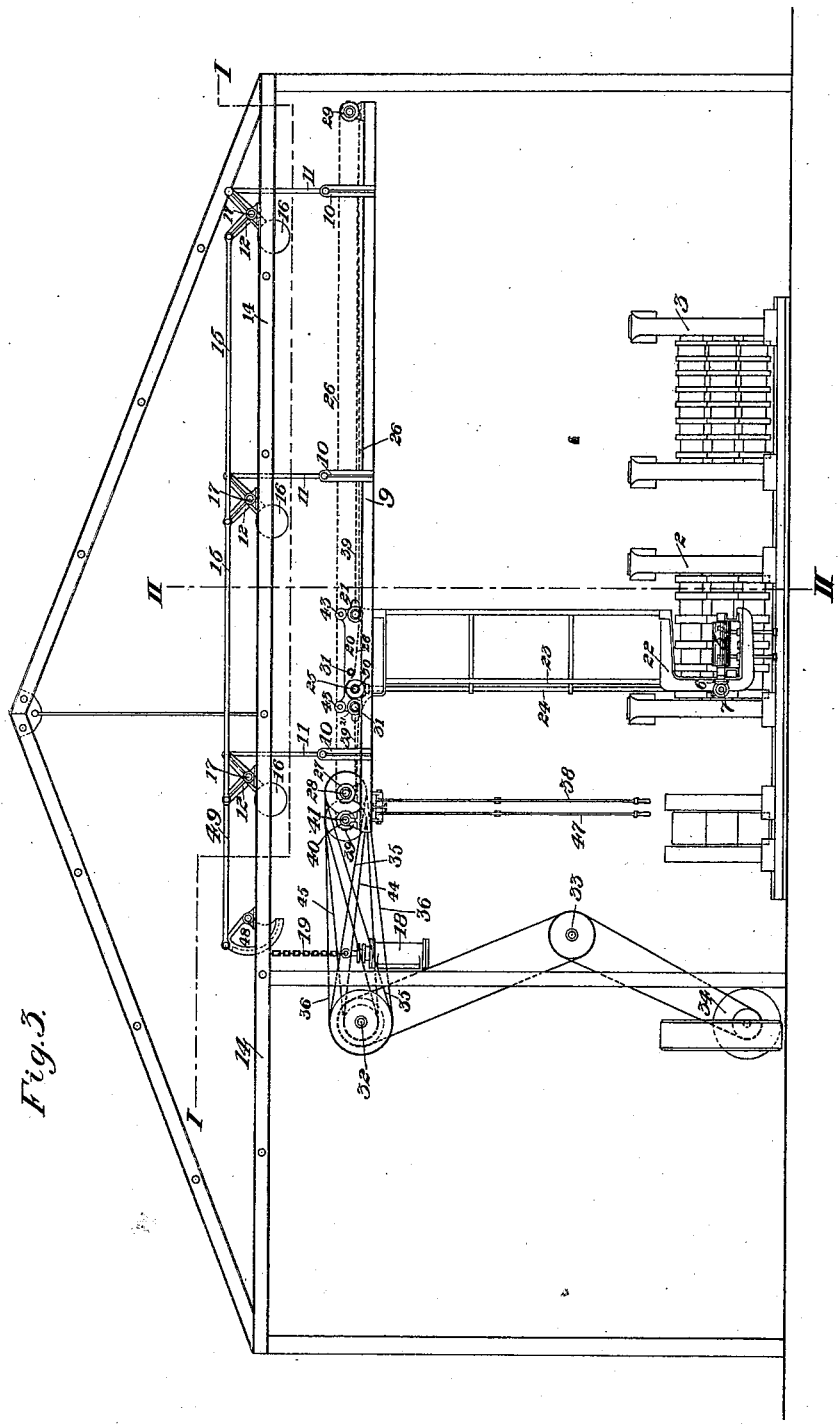
WITNESSES. INVENTOR.

UNITED STATES PATENT OFFICE.

JAMES MORGAN, OF PITTSBURG, PENNSYLVANIA.

FEED-TABLE FOR ROLLING-MILLS.

SPECIFICATION forming part of Letters Patent No. 403,204, dated May 14, 1889.

Application filed February 11, 1889. Serial No. 299,415. (No model.)

*To all whom it may concern:*

Be it known that I, JAMES MORGAN, of Pittsburg, in the county of Allegheny and State of Pennsylvania, have invented a new and useful Improvement in Feed-Tables for Rolling-Mills, of which the following is a full, clear, and exact description, reference being had to the accompanying drawings, forming part of this specification, in which—

Figure 1 is a sectional plan view of a rolling-mill plant provided with my improved feed-tables, the section being taken on the lines I I of Figs. 2 and 3. Fig. 2 is a vertical longitudinal section taken on the lines II II of Figs. 1 and 3. Fig. 3 is a vertical cross-section on the lines III III of Figs. 1 and 2.

Like symbols of reference indicate like parts in each.

In the drawings, 2 and 3 represent sets of rolls of a rolling-mill plant, each of which is three-high, as shown in the drawings, though for some purposes of my invention it is not necessary that they should be three-high rolls. The construction of the rolls and the manner of driving them do not form an essential feature of my invention, which relates solely to the feed-tables and to their accessory mechanism, which is designed to move the feed-tables for the purpose of shifting the metal laterally from one pass to another, and, if the feed-tables are used with three-high rolls, for elevating or lowering them.

My improved feed-tables are peculiar in that, instead of being supported from below, as feed-tables have commonly been, they are suspended from above, and if it is desired that the feed-tables should be movable laterally they are suspended from trolleys or carriages mounted on elevated tracks, while if the tables are to be movable vertically the suspending apparatus is connected with power mechanism—such as hydraulic cylinders—by which the desired vertical motion is effected.

In the drawings, 4 4 are the feed-tables, of which there are two—one on each side of the rolls 2 and 3. Each of these feed-tables is composed of side frames made, preferably, of parallel channel-bars, between which are journaled the feed-rollers 5. These rollers are provided at their ends with beveled gear-wheels 6, which mesh with beveled pinions 7 on shafts 8. These shafts are driven by elevated power-connections from the supporting-carriages, as hereinafter described.

9 are the tracks on which the supporting-carriages are mounted. They are preferably upheld by elevated supports in the mill-building, as clearly shown in Figs. 2 and 3, and extend transversely to the line of the feed-tables. Each of the tracks which I show in the drawings consists of two parallel flanged beams, preferably channel-beams, which are separated to permit the passage between them of the suspending mechanism of the feed-tables, and are connected at suitable intervals by yokes 10, consisting of strong frames, the ends of which underlie and support the tracks, while the middle or arched portions of the yokes are sufficiently elevated above the tracks to permit the passage of the trolleys or carriages, and are connected by links 11 with the ends of bell-crank levers 12, by which they may be lifted.

Each of the tracks is provided with a sufficient number of yokes to support it, and each of the yokes is suspended from a bell-crank lever, 12, as shown in Fig. 3, the levers of each track being fixed to cross-shafts 17, journaled in pillow-blocks 13 on a beam, 14, which extends above the track and parallel therewith, and is suitably supported by the uprights forming the frame-work of the mill-building.

All the supporting-levers on each of the beams 14 are connected by means of connecting-rods 15, and each is preferably provided with a counter-weight, 16, which opposes the weight of the supported feed-tables and partially balances the same. One or more of the cross-shafts 17 extends across all of the beams 14 and forms a common axis or torsion-shaft for the laterally-adjacent bell-crank levers 12, so as to operatively connect the whole system of levers and to cause them all to respond to the motion of any one. It is only necessary that one row of laterally-adjacent levers should be thus connected, though in the drawings I have shown them all so arranged. One of the end levers of the set is connected with the plunger of a hydraulic motor, 18, by a flexible connection, 19, a quadrant-lever, 48, and a connecting-rod, 49. The motor thus serves to actuate all the levers, as will be readily understood, so that by the movement of the plunger up or down all the tracks may be simultaneously and uniformly elevated or lowered by reason of the corresponding motion of the levers 12.

Each of the tracks is provided with a trolley or carriage, 20, mounted on wheels 21 on the track directly above the feed-tables, and each carriage is connected to the feed-table by means of a frame, 23, composed of strong upright bars attached to the carriage at the upper end and provided at the lower end with a stirrup or hanger, 22, on which the side rails of the feed-table are fixed. The stirrups 22 are made of cast-iron frames open at the side to permit removal of the metal from the feed-table. On one of the frames 23 of each of the feed-tables is journaled an upright rotary shaft, 24, provided at its lower end with a bevel-pinion gearing with a corresponding bevel gear-wheel on the shaft 8, and at its upper end, at the level of the carriage, provided with a gear-wheel meshing with a pinion on a sprocket-wheel shaft, 25, which is journaled in the frame of the carriage. Obviously this sprocket-wheel shaft is constantly in gear with the driving-shaft of the feed-rollers whatever be the position of the feed-table and carriage.

The sprocket-wheel shaft is driven by means of endless sprocket-chains 26, which pass around sprocket-wheels 27 on a driven counter-shaft, 28, around sprocket-wheels 29 at the other end of the track, and in contact with sprocket-wheels 30 on the shaft 25 and with idler-wheels 31 on the carriage. This arrangement is such that the carriages may be moved along the track without disengaging the sprocket-wheels 30 from the chains, and that in every position of the carriage the motion of the chains will rotate the shaft 24, and through it the rollers of the feed-table. The counter-shaft 28 is adapted to be driven in either direction by means of power-connections between it and a shaft, 32, which is connected, through suitable power-connections and an intermediate shaft, 33, with the driving-shaft of an engine, 34.

The power-connections between the shafts 28 and 32 consist of two belts, 35 and 36, one of which is crossed, and the belt-pulleys on the shaft 28 are provided with clutches 37, by which either pulley may be put into gear with the shaft. These pulleys effect the driving of the shaft in opposite directions, and thus enable the feed-rollers of each table to which the shaft is indirectly connected to be driven in either direction.

38 is the lever by which the clutches 37 are operated. Each of the carriages is moved backward and forward on its track by means of chains 39, which pass around sprocket-wheels 40 on a shaft, 41, and around sprocket-wheels 42. The ends of these chains are fastened to the carriages, as clearly shown in Fig. 3.

43 are idler-wheels on the carriages adapted to support and guide the moving parts of the chains. The shaft 41 is driven by belts 44 and 45 (one of which is crossed) from the shaft 32, and the belt-pulleys on the shaft 41 are provided with clutches 46, which are operated by means of a clutch-lever, 47, in the manner before described with reference to the clutches 37 and lever 38, so that by means of these clutches the shaft 41 may be driven in either direction and the carriages caused thereby to move backward or forward on their tracks, as may be desired.

The operation of my improved feed-tables is as follows: In order to move the tables laterally from one pass of the rolls to another, or from one set of rolls to another, the carriages 20 are caused to move on their tracks in the manner before described, and by such motion the feed-rollers will not be disconnected from gear with the driving mechanism on the carriages, which may be caused to operate in either direction, as already explained. If the feed-tables be used in connection with three-high rolls, they may be raised or lowered to shift the metal from one pass of the set of rolls to the next, either above or below, as the case may be, by action of the hydraulic motor 18, by means of which the tracks 9 and the supporting-carriages may be raised or lowered. The driving of the feed-rollers and the lateral motion of the feed-table are effected by means of the levers 38 and 47, and the hydraulic cylinder may be actuated or controlled by means of a valve situate in proximity to the said levers, so that the whole system may be under the control of a single person. As will be readily understood by those familiar with rolling-mill practice and the apparatus used therein, the parts or elements of my improvement may be modified in form and proportions to accomplish the same results in substantially the same way. Thus, instead of the sprocket wheels and chains which I have shown, many other mechanical elements may be substituted, and they may be operated either by means of water-power, steam-power, or otherwise. All these changes may be made with the exercise of mechanical ingenuity and skill, and do not involve a departure from my invention, as stated in the broad claims of this patent.

In order to provide means for turning the metal piece over on its side on the feed-tables, I may employ manipulators of any suitable construction. I prefer, however, to use that form of manipulator shown in Figs. 1 and 3, which comprises a suitable number of rods, 50 and 51, set vertically and loosely in cross-pieces 52 of the feed-table, so that they shall be movable freely in said cross-pieces. When the feed-table is at its normal positions in front of the passes of the rolls, these rods hang down below the tables, the tops of the rods being below the level of the feed-rollers, as shown by full lines in Figs. 2 and 3. If it be desired to turn the metal piece that is on the table over the rods 50, the table is lowered until the lower ends of the rods 50 and 51 strike the floor of the mill. This causes a relative upward motion of the rods, as shown by dotted lines in Fig. 3, and the rods 50, engaging the metal, raise it and tilt it over on its side against the now elevated rods 51, which serve as stops therefor. By providing the ends of the rods 50 with steps, so as to enable them to engage at more than one place with the metal, the metal may be turned several times on the table, as will be readily understood.

The advantages of my invention will be appreciated by those skilled in the art. The apparatus is simple in construction, is not liable to get out of order, and is very efficient in performing the work for which it is intended.

I claim—

1. The combination, with a rolling-mill feed-table, of elevated supports from which it is suspended, substantially as and for the purposes described.

2. A rolling-mill feed-table, in combination with a laterally-movable elevated support from which it is suspended, substantially as and for the purposes described.

3. A rolling-mill feed-table, in combination with a vertically-movable elevated support from which it is suspended, substantially as and for the purposes described.

4. In a rolling-mill plant, the combination of elevated tracks or ways, carriages mounted thereon, feed-tables suspended from the carriages, and a power-engine for moving the carriages on the tracks, substantially as and for the purposes described.

5. In a rolling-mill plant, the combination of elevated tracks or ways, carriages mounted thereon, feed-tables suspended from the carriages, a power-engine for moving the carriages on the tracks, and lifting mechanism by which the tracks are elevated vertically, substantially as and for the purposes described.

6. In a rolling-mill plant, the combination of elevated tracks or ways, carriages mounted thereon, feed-tables suspended from the carriages, a power-engine for moving the carriages on the tracks, a driving-shaft leading from one at least of the carriages to the feed-rollers, and a traveling power-connection in gear with the said driving-shaft, whereby power is transmitted thereto in any position of the carriage, substantially as and for the purposes described.

7. In a rolling-mill plant, the combination of elevated tracks or ways, carriages mounted thereon, feed-tables suspended from the carriages, a power-engine for moving the carriages on the tracks, lifting mechanism by which the tracks are elevated vertically, and arched yokes connecting the tracks with the suspending mechanism, substantially as and for the purposes described.

8. The combination, with a rolling-mill feed-table, of hangers or stirrups open at one side and connected with the table, and elevated supports from which the said hangers or stirrups and the table are suspended, substantially as and for the purposes described.

9. The combination, with a feed-table and lifting mechanism by which it is movable vertically, of upright movable bars carried by the table and extending below the same, whereby on descent of the table said bars shall engage the floor or other support, and shall thereby be elevated relatively to the table to turn the metal thereon, substantially as and for the purposes described.

10. The combination, with a feed-table and lifting mechanism by which it is movable vertically, of upright movable bars carried by the table and extending below the same, whereby on descent of the table said bars shall engage the floor or other support, and shall thereby be elevated relatively to the table to turn the metal thereon, and vertically-movable stop-bars also carried by the table, substantially as and for the purposes described.

In testimony whereof I have hereunto set my hand this 26th day of January, A. D. 1889.

JAMES MORGAN.

Witnesses:
J. K. SMITH,
F. X. BARR.